(12) United States Patent
Sasada

(10) Patent No.: US 7,558,438 B1
(45) Date of Patent: Jul. 7, 2009

(54) SYSTEM FOR SYNTHESIZING DIVISIONAL IMAGES BASED ON INFORMATION INDICATING RELATIONSHIP BETWEEN A SERIES OF DIVISIONAL IMAGES

(75) Inventor: Ryoji Sasada, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 800 days.

(21) Appl. No.: 09/460,429

(22) Filed: Dec. 14, 1999

(30) Foreign Application Priority Data

Dec. 15, 1998 (JP) ............................... 10-355789

(51) Int. Cl.
*G06K 9/36* (2006.01)
*G06K 9/42* (2006.01)
*G06K 9/44* (2006.01)
*G06K 9/03* (2006.01)
*G06K 9/00* (2006.01)

(52) U.S. Cl. .................. 382/284; 382/257; 382/311; 382/132

(58) Field of Classification Search ................ 382/284, 382/311, 297, 132, 257
See application file for complete search history.

(56) References Cited

U.S. PATENT DOCUMENTS

| | | | | |
|---|---|---|---|---|
| 4,263,916 A | * | 4/1981 | Brooks et al. | ............. 600/431 |
| 5,111,045 A | | 5/1992 | Konno et al. | |
| 5,485,500 A | * | 1/1996 | Baba et al. | ............. 378/98.2 |
| 5,528,290 A | * | 6/1996 | Saund | ............. 348/218.1 |
| 5,832,055 A | * | 11/1998 | Dewaele | ............. 250/587 |
| 5,982,951 A | | 11/1999 | Katayama et al. | |
| 5,991,444 A | * | 11/1999 | Burt et al. | ............. 382/232 |
| 5,991,461 A | * | 11/1999 | Schmucker et al. | ............. 382/284 |
| 6,038,349 A | * | 3/2000 | Cullen | ............. 382/294 |
| 6,097,833 A | * | 8/2000 | Lobregt et al. | ............. 382/130 |
| 6,128,400 A | * | 10/2000 | Le Beux et al. | ............. 382/132 |
| 6,273,606 B1 | * | 8/2001 | Dewaele et al. | ............. 378/174 |

FOREIGN PATENT DOCUMENTS

| EP | 737940 A2 | * | 10/1996 |
|---|---|---|---|
| JP | 62-055640 | | 3/1987 |
| JP | 3-287248 | | 12/1991 |
| JP | 03-287249 | | 12/1991 |
| JP | 06-292008 | | 10/1994 |
| JP | 08-154167 | | 6/1996 |
| JP | 09-321972 | | 12/1997 |
| JP | 10-268451 | | 10/1998 |

OTHER PUBLICATIONS

Baxes, Gregory A., "Digital Image Processing: Principles and Applications", 1994, John Wiley & Sons, Inc., p. 109.*

* cited by examiner

*Primary Examiner*—Wesley Tucker
(74) *Attorney, Agent, or Firm*—Sughrue Mion, PLLC

(57) ABSTRACT

An image synthesizing system for synthesizing more than one item of divisional image data respectively representing more than one divisional image of more than one portion of an object. The more than one item of divisional image data and additional information are supplied to a synthesizing unit, where the additional information indicates that the more than one item of divisional image data represents a series of images related to each other. The synthesizing unit synthesizes the more than one item of divisional image data based on the additional information to obtain an item of synthesized image data representing a synthesized image.

25 Claims, 10 Drawing Sheets

LINE OF DISCONTINUITY OF DENSITY
(POSITION IN WHICH DENSITY CHANGES ABRUPTLY)

SYSTEM FOR SYNTHESIZING DIVISIONAL IMAGES BASED ON INFORMATION INDICATING RELATIONSHIP BETWEEN A SERIES OF DIVISIONAL IMAGES

BACKGROUND OF THE INVENTION

1. Field of the Invention

The present invention relates to an image synthesizing system for obtaining a synthesized image by synthesizing more than one divisional image which is obtained by taking photographs or radiographs of a plurality of portions of an object. The present invention is applicable, for example, to radiography of a whole spine.

2. Description of the Related Art

In various applications of radiography, an item of image data is obtained by reading a radiographic image recorded on a recording sheet or the like, and is then appropriately processed. The radiographic image is reproduced from the processed image data and recorded. The radiographic image recording and reproducing system using stimulable phosphor sheets is one of such applications. There are a number of patent applications relating to the radiographic image recording and reproducing system using stimulable phosphor sheets and being assigned to the assignee of the present application.

For example, Japanese Unexamined Patent Publication No. 3 (1991)-287248, proposes use of a long stimulable phosphor sheet having a record area corresponding to the whole length of the spine as an object of radiography so that the whole spine can be radiographed and the radiograph of the whole spine can be reproduced and recorded for diagnosis of scoliosis. However, it is not easy to handle such a long stimulable phosphor sheet, and only a dedicated reading device can read image data from such a long stimulable phosphor sheet. Therefore, Japanese Unexamined Patent Publication No. 3 (1991)-287249, proposes a radiographic image recording and reading device which uses a plurality of conventional stimulable phosphor sheets for separately radiographing a plurality of portions of an object to obtain a plurality of divisional images, and then synthesizing data of the divisional images to obtain synthesized image data representing a synthesized image for diagnosis of spinal curvature.

In addition, Japanese Unexamined Patent Publication No. 10(1998)-268451, proposes a method of separately radiographing a plurality of portions of an object to obtain divisional images, wherein an image of a reference lattice pattern is recorded in the stimulable phosphor sheets at the same time as the divisional images of the object are recorded (radiographed) therein, and a synthesized image is obtained based on the pattern. According to this method, the synthesized image is obtained so that a reference lattice pattern is reconstructed from more than one portion of the pattern included in the respective divisional images. Therefore, the synthesized image can be produced based on correct recognition of the order and orientations of the divisional images.

However, generally, the above radiographic image recording and reproducing system also handles a single radiographic image which is independent of other radiographic images handled by the radiographic image recording and reproducing system, in addition to divisional images obtained as radiographs of a plurality of portions of an object as mentioned above. Therefore, when producing a synthesized image by reading divisional images recorded in a plurality of stimulable phosphor sheets according to Japanese Unexamined Patent Publication No. 10(1998)-268451, operators must monitor correspondences between the stimulable phosphor sheets and the divisional images recorded in the respective stimulable phosphor sheets after the radiographs are obtained until the synthesizing operation is completed. Thus, a heavy load is imposed on the operators. In addition, although the operator can confirm whether or not each radiograph corresponds to one of a set of divisional images by reproducing the radiographic images on a monitor, the operation of displaying all radiographs on the monitor is very bothersome when handling a large number of radiographs.

Further, in the method according to Japanese Unexamined Patent Publication No. 10(1998)-268451, the reference lattice pattern is automatically detected, and relative positions and orientations of the divisional images are corrected based on the reference lattice pattern to obtain the synthesized image. Therefore, if the reference lattice pattern is detected incorrectly, the synthesized image cannot be obtained correctly. Furthermore, the reference lattice pattern appears as a visible image in the synthesized image, and therefore the image of the object is hard to see due to interference with the visible image of the reference lattice pattern. Otherwise, the operator may be able to perform a synthesizing operation manually without the reference lattice pattern by monitoring the divisional images on the monitor and recognizing the relative positions and orientations. However, this operation requires skill, and a heavy load is imposed on the operator.

SUMMARY OF THE INVENTION

An object of the present invention is to provide an image synthesizing system whereby a synthesized image can be easily obtained from divisional images.

According to the present invention, there is provided an image synthesizing system for obtaining an item of synthesized image data by synthesizing more than one item of divisional image data representing more than one divisional image which is obtained by taking photographs or radiographs of a plurality of portions of an object. The image synthesizing system contains an input unit for inputting the above more than one item of divisional image data and additional information including information indicating that the more than one item of divisional image data is a series of image data related to each other, a synthesizing unit for synthesizing the more than one item of divisional image data based on the additional information to obtain the item of synthesized image data, and an output unit for outputting the item of synthesized image data.

That is, according to the present invention, the more than one item of divisional image data and the additional information are input by the input unit, and the more than one item of divisional image data is synthesized based on the additional information to obtain the synthesized image data. Since the additional information includes the information which indicates that the more than one item of divisional image data is a series of image data related to each other, it is recognized that the more than one item of image data which has been input constitutes a continuous image. Therefore, the more than one item of divisional image data can be synthesized based on the additional information, and it is not necessary for the operator to continuously monitor the stimulable phosphor sheets and the more than one item of image data from the time the photographs or radiographs are taken until the more than one item of image data is synthesized. Further, it is also unnecessary for the operator to confirm whether or not the more than one item of image data under processing constitutes a continuous image. Thus, the load imposed on the operators can be reduced. In addition, since the reference lattice pattern is not necessary, the synthesized image does not contain the interfering pattern as in the technique proposed by Japanese Unexamined Patent Publication No. 10(1998)-268451.

For example, in the case wherein more than one divisional image is recorded in more than one stimulable phosphor sheet, the additional information may contain more than one item of bar code information each of which corresponds to one of the more than one stimulable phosphor sheets, and information indicating that more than one item of image data obtained from the more than one stimulable phosphor sheet is a series of divisional image data obtained by taking photographs or radiographs of a plurality of portions of an object. Each of the above more than one item of bar code information can be recognized by reading a bar code attached on each stimulable phosphor sheet.

Preferably, the above synthesizing unit may contain a geometrical mismatch correction information determination unit for determining geometrical mismatch correction information for correcting a geometrical mismatch between the more than one divisional image, and a geometrical mismatch correction unit for correcting the geometrical mismatch between the more than one divisional image.

The "geometrical mismatch" corresponds to parallel displacement, rotation, and differences in size between the more than one divisional image. That is, the "geometrical mismatch correction information" is information based on which the geometrical mismatch between the more than one divisional image can be corrected. For example, the "geometrical mismatch correction information" may be amounts of the geometrical mismatch between the more than one divisional image, or coefficients of affine transformations in the case wherein the more than one divisional image is affine transformed before the more than one item of divisional image is synthesized.

In addition, the image synthesizing system according to the present invention may preferably contain a divisional image storage unit for storing the more than one item of divisional image data and the additional information associated with the more than one item of divisional image data. In the case wherein the synthesizing unit contains the above-mentioned geometrical mismatch correction information determination unit and the geometrical mismatch correction unit, the divisional image storage unit may store the more than one item of divisional image and at least one of the additional information and geometrical mismatch correction information associated with the more than one item of divisional image.

When the image synthesizing system according to the present invention contains a divisional image storage unit which stores the more than one item of divisional image and the additional information associated with the more than one item of divisional image, or the more than one item of divisional image and at least one of the additional information and geometrical mismatch correction information associated with the more than one item of divisional image, the image synthesizing system can be constructed as a database system, and therefore the synthesized image or the more than one divisional image can be easily referred to.

Preferably, the synthesizing unit may further contain a unit for matching conditions in the more than one divisional image for the synthesizing operation. For example, this unit matches densities and contrast in the more than one divisional image.

When the conditions in the more than one divisional image for the synthesizing operation, for example, densities and contrast, are matched, the synthesized image can be produced based on uniform conditions on densities and contrast. That is, the quality of the synthesized image can be improved.

In addition, the image synthesizing system according to the present invention may contain a data obtaining unit for obtaining the more than one item of divisional image and the additional information. In this case, the data obtaining unit may contain a unit for matching conditions for obtaining the more than one divisional image. For example, these conditions may include conditions for reading the more than one divisional image recorded in the more than one stimulable phosphor sheet, normalization conditions, and image processing conditions for processing the obtained divisional image data.

When the image synthesizing system according to the present invention contains the data obtaining unit, which obtains the divisional image data and the additional information, the image synthesizing system can perform by itself all of the operations of obtaining the more than one divisional image and the additional information, inputting data, synthesizing image data, and outputting the synthesized image data.

When the data obtaining unit contains a unit for matching conditions for obtaining the respective divisional images, such as the conditions for reading the more than one item of divisional image data recorded in the more than one stimulable phosphor sheet, the normalization conditions, and the image processing conditions for processing the obtained divisional image data, all the portions of the synthesized image have the same appearance. That is, the quality of the synthesized image is improved by providing the unit for matching conditions for obtaining the more than one divisional image.

Further, the above additional information may preferably include position information which indicates relative positions of the more than one divisional image at the time photographs of the more than one divisional image are taken, and orientation information which indicates orientations of the more than one divisional image at the time photographs or radiographs of the more than one divisional image are taken.

When the additional information includes position information which indicates relative positions of the more than one divisional image at the time photographs or radiographs of the more than one divisional image are taken, the more than one divisional image can be arranged in the correct order to obtain the synthesized image.

When the additional information includes the orientation information which indicates orientations of the more than one divisional image at the time photographs or radiographs of the more than one divisional image are taken, the more than one divisional image can be arranged with the correct orientations to obtain the synthesized image.

Furthermore, the image synthesizing system according to the present invention may preferably contain the following units.

(1) A synthesized image storage unit for storing the synthesized image.

(2) A synthesized image displaying unit for displaying the synthesized image.

(3) A synthesized image correction unit for correcting the synthesized image displayed by the synthesized image displaying unit.

When the image synthesizing system according to the present invention contains the synthesized image displaying unit, which displays the synthesized image, the operator can confirm whether or not the more than one divisional image is correctly synthesized.

When the image synthesizing system according to the present invention contains the synthesized image correction unit, which is used for correcting the synthesized image displayed by the synthesized image displaying unit, the operator can correct the synthesized image when the operator recognized that the more than one divisional image is not correctly synthesized.

In the image synthesizing system according to the present invention, each pair of adjacent divisional images, of the more than one divisional image, may abut each other. However, it is preferable that each pair of adjacent divisional images have identical or overlapping portions. This is because the more than one divisional image can be synthesized easily and accurately by aligning each pair of adjacent divisional images so that the overlapping portions of each pair of adjacent divisional images coincide. The more than one divisional image can be obtained by taking a radiograph of the object in a plurality of recording sheets, where each pair of the plurality of recording sheets that are adjacent partially overlap.

Incidentally, some image reading apparatuses cannot read out a portion of a divisional image which is recorded in a near-edge portion of each recording sheet. In this case, the portion of the divisional image recorded in the near-edge portion of each recording sheet may be lost in the synthesized image. That is, it is impossible to reproduce the lost portion of the divisional image by synthesizing more than one divisional image obtained from a plurality of recording sheets when each pair of adjacent recording sheets abut each other, i.e., when each pair of adjacent recording sheets do not overlap.

On the other hand, when each pair of adjacent recording sheets overlap, it is possible to avoid the above loss, in the synthesized image, of the portion of the divisional image recorded in the near-edge portion of each recording sheet, since the portion of the divisional image, which is recorded in the near-edge portion of one of each pair of adjacent recording sheets and is then lost due to failure in reading, can be reproduced from an overlapping portion of a divisional image which is recorded in the other of each pair of adjacent recording sheets and covers the lost portion.

The above plurality of recording sheets may be a plurality of stimulable phosphor sheets which emit, upon exposure to stimulating light, accelerated phosphorescence light having an amount corresponding to the energy of radiation to which the plurality of stimulable phosphor sheets were exposed.

In addition, preferably, the synthesizing unit may adopt into the synthesized image one of the overlapping portions of a pair of adjacent divisional images obtained from each pair of adjacent recording sheets, where that one of the overlapping portions is recorded in one of each pair of adjacent recording sheets which is located nearer to the object than the other of each pair of adjacent recording sheets when the radiograph is taken. This is because before being applied on one of the overlapping portions of each pair of adjacent recording sheets which is located further from the object, stimulating light is partially cut off by the other of the overlapping portions of each pair of adjacent recording sheets which is located nearer to the object. Therefore, a radiological dosage to the overlapping portion of the recording sheet which is located further from the object is smaller than a radiological dosage to the nonoverlapping portion of the recording sheet. Consequently, discontinuity of density appears in the synthesized image at a position corresponding to the boundary between the overlapping portion and the nonoverlapping portion. On the other hand, no discontinuity of density appears in the divisional image recorded in the recording sheet which is located nearer to the object, at the position corresponding to the boundary between the overlapping portion and the nonoverlapping portion. Thus, a continuous synthesized image can be obtained by adopting into the synthesized image the portion of the divisional image recorded in that one of the overlapping portions of each pair of adjacent recording sheets which is located nearer to the object.

Further, since the luminous energy or the radiological dosage to an overlapping portion of a recording sheet which is located further from the object is smaller than the luminous energy or the radiological dosage to a nonoverlapping portion of the recording sheet, granularity of a portion of a divisional image recorded in the overlapping portion of the recording sheet which is located further from the object is deteriorated, compared to granularity of the other portion of the divisional image recorded in the nonoverlapping portion of the recording sheet. It is impossible to improve the deteriorated granularity in the overlapping portion of the divisional image to the same level as the granularity of the nonoverlapping portion of the divisional image, by simply equalizing density of the overlapping portion with density of the nonoverlapping portion.

DESCRIPTION OF THE PREFERRED EMBODIMENTS

The embodiments of the present invention are explained below with reference to the drawings.

First Embodiment

Figure 1:
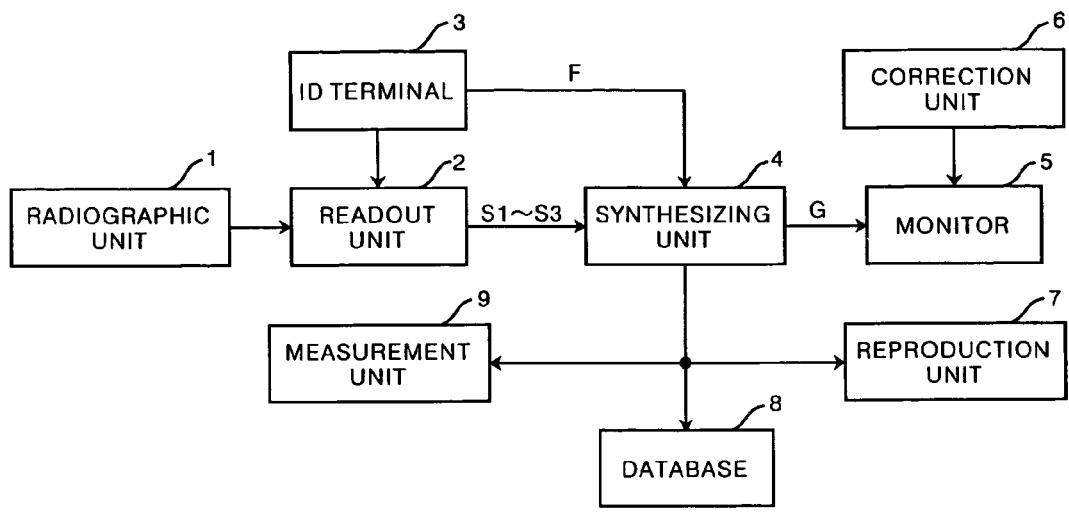
FIG. 1 is a block diagram illustrating the construction of the image synthesizing system in the first embodiment of the present invention.

FIG. 1 is a block diagram illustrating the construction of the image synthesizing system as the first embodiment of the present invention. As illustrated in FIG. 1, the image synthesizing system as the first embodiment of the present invention contains a radiographic unit 1, a readout unit 2, an ID terminal (IDT) 3, a synthesizing unit 4, a monitor 5, a correction unit 6, a reproduction unit 7, a database 8, and a measurement terminal 9.

The radiographic unit 1 takes radiographs of a plurality of portions of the whole spine as an object to record a plurality of divisional images in a plurality of stimulable phosphor sheets. The readout unit 2 photoelectrically reads the divisional images recorded in the plurality of stimulable phosphor sheets to obtain three items of divisional image data S1, S2, S3 respectively representing the divisional images recorded in the stimulable phosphor sheets. The ID terminal (IDT) 3 inputs additional information F (explained later) into the readout unit 2. The synthesizing unit 4 synthesizes the three items of divisional image data S1, S2, S3 based on the additional information F to obtain synthesized image data G. The monitor 5 displays a synthesized image represented by the synthesized image data G. The correction unit 6 corrects the synthesized image displayed on the monitor 5, if necessary. The reproduction unit 7 reproduces the synthesized image by recording the synthesized image data G on a film. The database 8 stores the synthesized image data G. The measurement of the synthesized image is performed by using the measurement terminal 9.

Figure 2A:
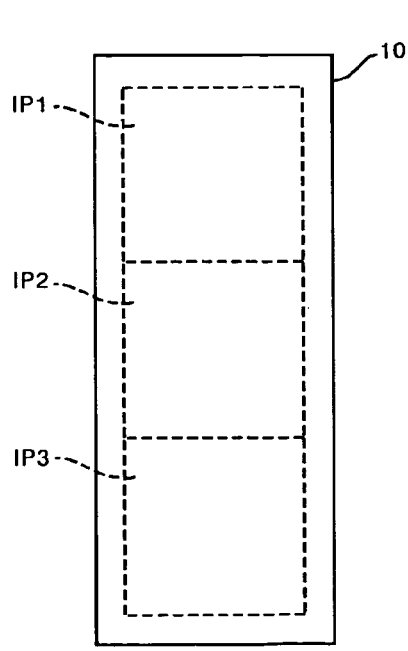
FIG. 2a is a diagram illustrating an example of arrangement of a plurality of stimulable phosphor sheets in a long cassette.
Figure 3:
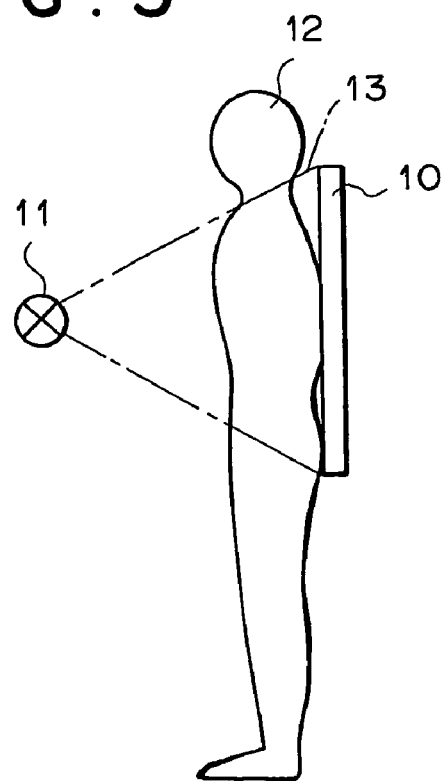
FIG. 3 is a diagram illustrating the construction of the radiographic unit.

The radiographic unit 1 can contain three stimulable phosphor sheets IP1, IP2, and IP3 in the long cassette 10 as illustrated in FIG. 2a, where each pair of adjacent stimulable phosphor sheets IP1 and IP2, or IP2 and IP3, may abut each other, or near-edge portions of the adjacent stimulable phosphor sheets in each pair may overlap. As shown in FIG. 3, the stimulable phosphor sheets IP1 to IP3 contained in the long cassette 10 are exposed to the radiated rays 13 emitted from the radiation source 11 and passed through an object 12, so that the three portions of the whole spine of the object 12 are separately recorded in the respective stimulable phosphor sheets IP1 to IP3.

Then, each of the stimulable phosphor sheets IP1 to IP3 exposed to the radiated rays 13 is transferred from the long cassette 10 to a standard cassette which has a size of one stimulable phosphor sheet. The divisional images recorded in the stimulable phosphor sheets IP1 to IP3 are read out after each of the stimulable phosphor sheets IP1 to IP3 is contained in a standard cassette, as illustrated in FIG. 4b.

Figure 4A:
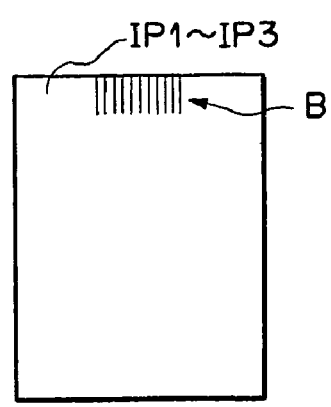
FIG. 4a is a diagram illustrating a stimulable phosphor sheet to which a bar code is attached.
Figure 4B:
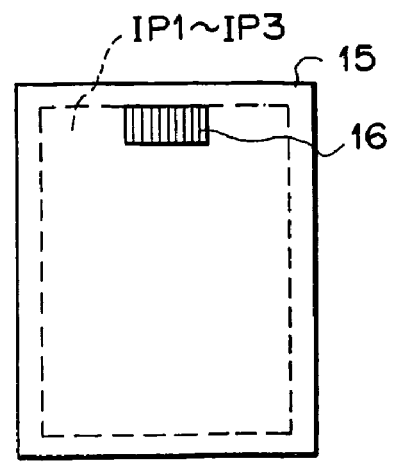
FIG. 4b is a diagram illustrating a stimulable phosphor sheet contained in the standard cassette having a bar code readout window.

As illustrated in FIG. 4a, a bar code B is attached on each of the stimulable phosphor sheets IP1 to IP3, and as illustrated in FIG. 4b, each standard cassette, which contains one of the stimulable phosphor sheets IP1 to IP3, has a bar code readout window 16 in a position corresponding to the bar code B on each stimulable phosphor sheet.

The ID terminal (IDT) 3 has a bar code reader. When the readout unit 3 reads the divisional images from the stimulable phosphor sheets IP1 to IP3, the ID terminal 3 reads the bar codes B on the stimulable phosphor sheets IP1 to IP3 in the order from IP1 to IP3 to obtain bar code information of the respective stimulable phosphor sheets. In addition, when information which indicates that the images recorded in the stimulable phosphor sheets IP1 to IP3 are related to each other is input into the ID terminal 3, the ID terminal 3 generates the additional information F based on the above information input to the ID terminal 3 and the bar code information. The generated additional information F is supplied to the synthesizing unit 4 which is explained later. In the case wherein the above information input to the ID terminal 3 is not input to the ID terminal 3, the ID terminal 3 does not generate the additional information F. Therefore, no additional information F is supplied to the synthesizing unit 4, and the synthesizing unit 4 does not perform the synthesizing operation on an image read out from a stimulable phosphor sheet.

Figure 5:
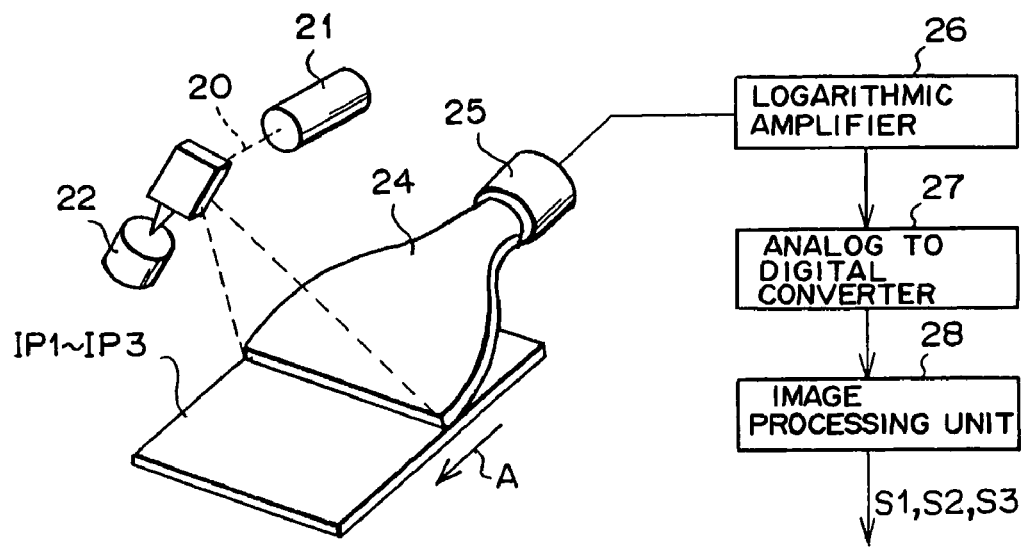
FIG. 5 is a diagram illustrating the constructions of the readout unit.

As illustrated in FIG. 5, the readout unit 2 contains a laser source 21, a deflection unit 22, a condenser guide 24, and a photomultiplier 25. The laser source 21 emits laser light 20 as stimulating light to be applied onto the stimulable phosphor sheets IP1 to IP3, which are conveyed by a conveyor (not shown) in the direction A (as indicated by an arrow in FIG. 5). The deflection unit 22 reflects and deflects the laser light 20 from the laser source 21 to apply the deflected light over the stimulable phosphor sheets IP1 to IP3. The deflection unit 22 may be realized by a galvanometer mirror. When the deflected light from the deflection unit 22 is applied to each point on the stimulable phosphor sheet, the condenser guide 24 collects the accelerated phosphorescence light emitted from the point, where the accelerated phosphorescence light carries image information on the divisional images. The photomultiplier 25 photoelectrically detects the accelerated phosphorescence light collected by the condenser guide 24. The photomultiplier 25 is connected to a logarithmic amplifier 26, and the logarithmic amplifier 26 is connected to an analog to digital converter 27. The analog to digital converter 27 is further connected to an image processing unit 28.

When the accelerated phosphorescence light is injected into the condenser guide 24, the accelerated phosphorescence light is totally reflected a number of times by inside surfaces of the condenser guide 24 and goes forward to exit from an outgoing end surface. The accelerated phosphorescence light is then received by the photomultiplier 25. The photomultiplier 25 converts an intensity of the accelerated phosphorescence light into an analog image signal. Since the intensity of the accelerated phosphorescence light represents the divisional image data, the analog image signal also represents the same. The analog image signal is then logarithmically amplified by the logarithmic amplifier 26, and the amplified signal is converted by the analog to digital converter 27 to digital image data. Further, image processing, such as conversion of gradation (grey level), is performed on this digital image data to obtain the divisional image data S1 to S3. The divisional image data S1 to S3 are supplied to the synthesizing unit 4 to be synthesized therein.

The synthesizing operation is performed by the synthesizing unit 4 in the following steps.

(a) An amount (correlation value) of correlation between the divisional images S1 and S2 in the area in which the divisional images S1 and S2 overlap (or on the border at which the divisional images S1 and S2 abut) and an amount (correlation value) of correlation between divisional images S2 and S3 in the area in which the divisional images S2 and S3 overlap (or on the border on which the divisional images S2 and S3 abut) are obtained.

(b) Amounts of parallel displacement, rotation, and magnification or reduction which maximize the correlation values are obtained as the aforementioned amounts of geometrical mismatch.

(c) Coefficients of affine transformations are determined based on the above amounts of geometrical mismatch.

(d) The affine transformations having the above coefficients are performed on the divisional image data S1 to S3.

The above synthesizing operation by using affine transformation is explained below in detail. Since the synthesizing operation of the divisional image data S2 and S3 only differs from the synthesizing operation of the divisional image data S1 and S2 in their coefficients, the following explanation is given only for the synthesizing operation of the divisional image data S1 and S2.

$$\begin{pmatrix} x2 \\ y2 \end{pmatrix} = \begin{pmatrix} a & b \\ -b & a \end{pmatrix} \cdot \begin{pmatrix} x1 \\ y1 \end{pmatrix} + \begin{pmatrix} c \\ d \end{pmatrix}, \tag{1}$$

where x1 and y1 are coordinates of the divisional image data S1, and x2 and y2 are coordinates of the divisional image data S2.

By the coordinate transformation according to equation (1), magnification or reduction, rotation, and parallel displacement of the whole divisional image represented by the divisional image data S1 are performed at the same time.

The coefficients a, b, c, and d in equation (1) are determined as follows.

The equation (1) can be re-written as the following two equations (2) and (3).

$$x2 = ax1 + by1 + c \tag{2}$$

$$y2 = -bx1 + ay1 + d \tag{3}$$

When (x11, y11) and (x12, y12) are coordinates of two points in the divisional image data S1 at which points the amount of correlation between the divisional image data S1 and S2 is maximized, and (x21, y21) and (x22, y22) are coordinates of two points in the divisional image data S2 corresponding to the points of the coordinates (x11, y11) and (x12, y12) in the divisional image data S1, the following equations (4), (5), (6), and (7) exist.

$$x21 = ax11 + by11 + c \tag{4}$$

$$x22 = ax12 + by12 + c \tag{5}$$

$$y21 = -bx11 + ay11 + d \tag{6}$$

$$y22 = -bx12 + ay12 + d \tag{7}$$

Since the number of coefficients to be obtained is four, these coefficients can be obtained by solving the above series of equations (4), (5), (6), and (7).

Thus, the divisional image data S1 is affine transformed based on the coefficients obtained as above, and the affine transformed divisional image data S1 is matched to the divisional image data S2. Similarly, the divisional image data S2 and S3 can be matched. Then, the synthesized image data G can be obtained by combining the matched divisional image data.

Next, the operation of the first embodiment is explained below.

Figure 6:
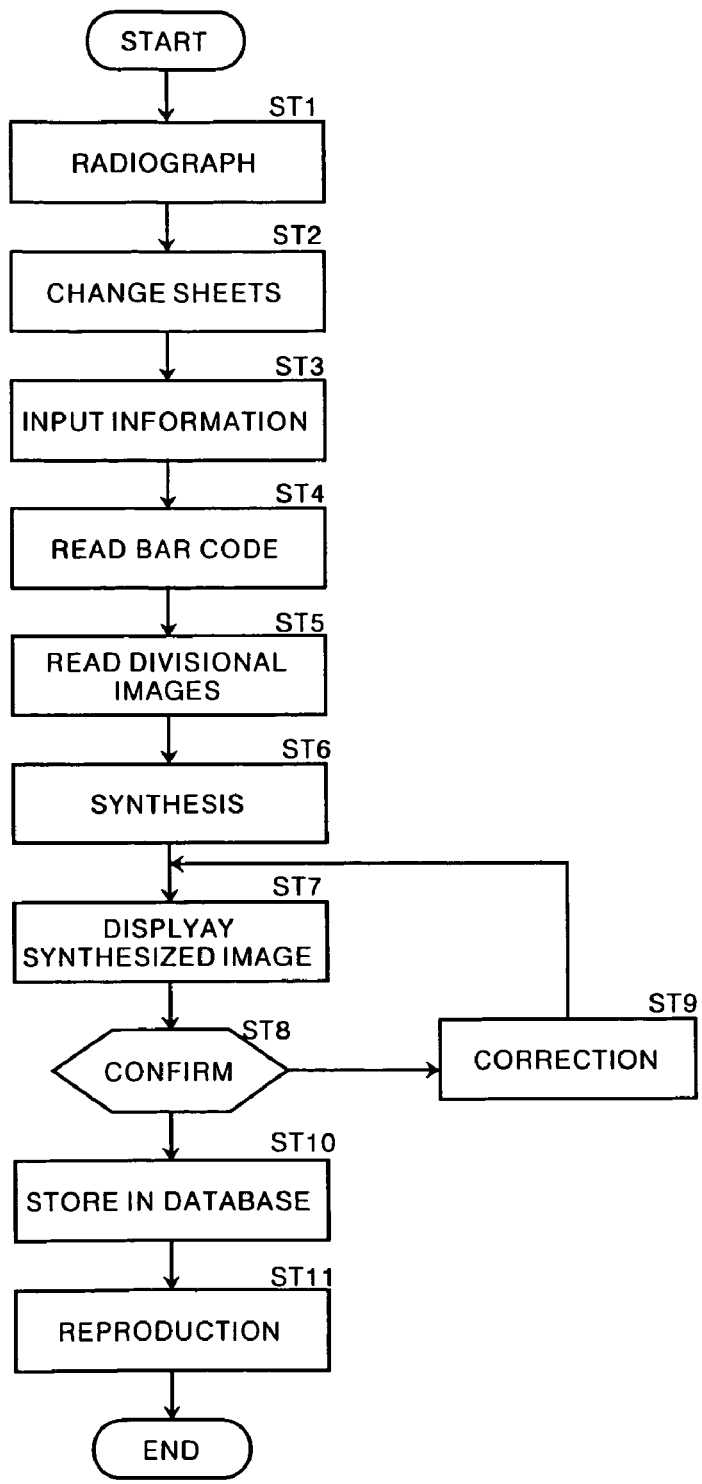
FIG. 6 is a flowchart indicating the operations in the first embodiment of the present invention.

FIG. 6 is a flowchart for indicating the operations in the first embodiment of the present invention.

In step ST1, the long cassette 10 containing the three stimulable phosphor sheets IP1 to IP3 is set in the radiographic unit 1, and the radiographic unit 1 takes radiographs of three parts of the whole spine as an object to record divisional images in three stimulable phosphor sheets IP1 to IP3. In step ST2, the stimulable phosphor sheets IP1 to IP3 are taken out from the long cassette 10, and is then set in the standard cassette 15 of the standard size. The operations in step ST2 are performed in a darkroom.

Next, in step ST3, information is input into the ID terminal 3, and the information indicates that the stimulable phosphor sheets IP1 to IP3 record divisional images which are related to each other, i.e., the stimulable phosphor sheets IP1 to IP3 record divisional images which are to be arranged in series. In step ST4, the bar codes B attached to the stimulable phosphor sheets IP1 to IP3 are read by the bar code reader through the bar code readout window 16 of the standard cassette 15 in the order from the stimulable phosphor sheet IP1 to the stimulable phosphor sheet IP3. Then, the above information input into the ID terminal 3 and the bar code read by the bar code reader are supplied to the synthesizing unit 4 as the additional information F. In addition, when further information indicating the relative positions and orientations of the divisional images at the time radiographs of the object are taken as the divisional images is included in the additional information F by the ID terminal 3, the synthesizing unit 4 can obtain the synthesized image based on correct recognition of the order and orientations of the divisional images.

In step ST5, the readout unit 2 reads out the divisional images recorded in the stimulable phosphor sheets IP1 to IP3 in the order from the stimulable phosphor sheet IP1 to the stimulable phosphor sheet IP3. The readout unit 2 performs the readout operation and image processing under the same conditions for all of the stimulable phosphor sheets IP1 to IP3 to obtain the divisional image data S1 to S3. The conditions include readout conditions (such as the gain of the photomultiplier, the intensity of the laser light, and the like) and image processing conditions (such as conditions for gradation processing, the normalization condition, and the like). The divisional image data S1 to S3 obtained by the readout unit 2 are supplied to the synthesizing unit 4.

In step ST6, the synthesizing unit 4 synthesizes the divisional image data S1 to S3 to obtain the synthesized image data G. In the synthesizing operation, the divisional image data S1 to S3 may be processed so that the densities and the contrast of the respective divisional image data S1 to S3 are matched. In step ST7, the synthesized image data G obtained by the synthesizing unit 4 is supplied to the monitor 5 to be displayed thereon as the synthesized image. In step ST8, the operator sees the synthesized image displayed on the monitor 5, and can confirm whether or not the divisional image data S1 to S3 are appropriately connected to each other. In step ST9, the operator can correct the respective divisional images by using the correction unit 6 so that the appropriate synthesized image is obtained, if necessary.

When it is determined in step ST8 that the divisional image data S1 to S3 are appropriately connected to each other, the synthesized image data G is stored in the database 8 in step ST10. In step ST11, the synthesized image data G stored in the database 8 is supplied to the reproduction unit 7 when reproduction of the synthesized image data G is required. The reproduction unit 7 records the synthesized image data G in a film to be output in step ST11. Before recording the synthesized image data G in the film, the reproduction unit 7 may reduce the size of the synthesized image, or magnify only a required portion, so that the reduced synthesized image or the magnified image of the required portion is recorded in the film.

The synthesized image data G obtained as above can be supplied to the measurement unit 9 when required. The operator can perform measurement of the total length and angles of the spine for diagnosis by using the measurement unit 9. In the measurement, the synthesized image is first displayed on a monitor provided in the measurement unit 9. Then, the operator inputs a purpose of the measurement, and designates a measurement point by using an input means such as a mouse. In this case, the synthesized image may be magnified so that the measurement point can be easily designated. The measurement unit 9 calculates a length and an angle from the designated measurement point according to the inputted purpose, and displays the calculated result on the monitor for diagnosis. The result of the measurement may be stored in the database 8, associated with the synthesized image data G.

Since, as described above, the synthesized image data G is obtained by synthesizing the divisional image data S1 to S3 based on the additional information F in the first embodiment, the synthesizing unit 4 can recognize, based on the additional information F, that the image data input into the synthesizing unit 4 are divisional image data S1 to S3. Therefore, it is no longer necessary for the operator to continuously monitor the stimulable phosphor sheets and the image data from the time the radiographs are taken until the image data are synthesized. In addition, it is also not necessary for the operator to display the image data for confirming whether or not the image data are divisional image data. Thus, the load imposed on the operators can be reduced. Further, since it is not necessary to radiograph the reference lattice pattern and the object at the same time, the synthesized image does not contain the interfering pattern.

In addition, when the densities and the contrast of all of the divisional image data S1 to S3 are matched, the synthesized image can be produced based on uniform conditions on density and contrast. That is, the quality of the synthesized image can be improved.

Further, when the condition for reading divisional image data recorded in the stimulable phosphor sheets, the normalization condition and the image processing conditions in processing the obtained divisional image data are made identical for all the respective divisional image data S1 to S3, all of the portions of the synthesized image have the same appearance. That is, the quality of the synthesized image is improved by matching the above conditions.

Incidentally, when reduction of the synthesized image is required for saving hardware resources such as a display device and a printer, the synthesizing unit may reduce the plurality of divisional images, and then synthesize the reduced divisional images. If the reduction is performed after the divisional images are synthesized, the divisional images can be aligned with each other with high accuracy. However, in this case, it takes a relatively long time to perform the synthesizing operation. On the other hand, when the synthesizing operation is performed after the divisional images are reduced, processing time required for the synthesizing operation can be remarkably reduced.

Although the database 8 stores the synthesized image data G in the first embodiment, the database 8 may store the additional information F and the divisional image data S1 to S3 associated with each other. Otherwise, the database 8 may store, as geometrical mismatch correction information, the aforementioned coefficients of the affine transformation or the aforementioned amounts of geometrical mismatch, associated with the divisional image data S1 to S3. Further, the database 8 may store the above additional information F and the above geometrical mismatch correction information, associated with the divisional image data S1 to S3. In this case, a separate database for storing the additional information, the geometrical mismatch correction information, and the divisional image data S1 to S3, may be provided separately from the database 8 storing the synthesized image data G. Otherwise, the synthesized image data G may be stored in the database, associated with information indicating the divisional image data S1, S2, and S3 corresponding to the synthesized image data G. In the second embodiment which is explained later, image data may also be stored in these ways.

Figure 7:
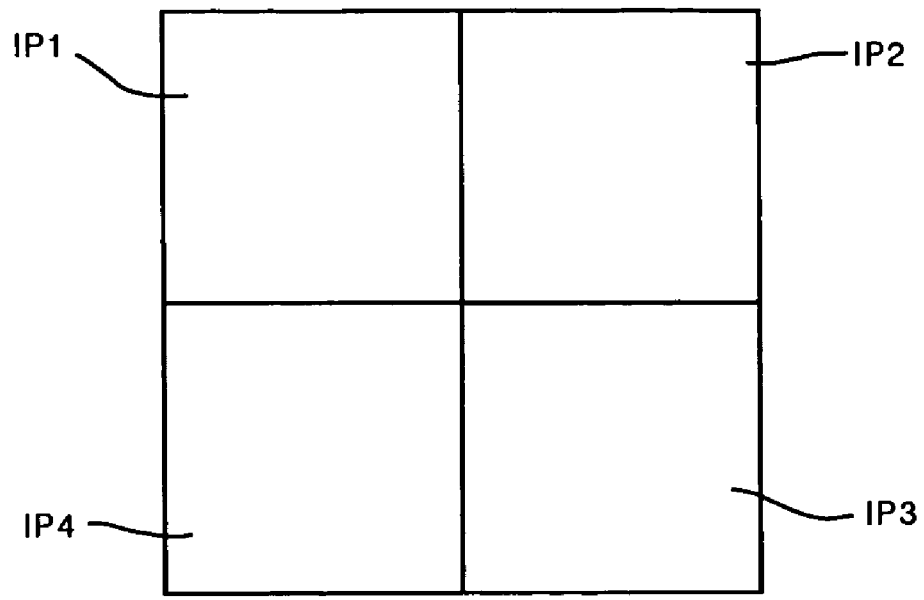
FIG. 7 is a diagram illustrating another arrangement of the stimulable phosphor sheets.

In addition, although, in the first embodiment, the divisional image data are recorded in three stimulable phosphor sheets, the number of divisions may be two or more than three. For example, four stimulable phosphor sheets IP1 to IP4 may be arranged as illustrated in FIG. 7 for radiographing an object, and a synthesized image may be obtained from four items of divisional image data obtained from the above four stimulable phosphor sheets IP1 to IP4. In this case, information indicating that the stimulable phosphor sheets IP1 to IP4 are arranged as illustrated in FIG. 7 is supplied as additional information F from the ID terminal 3 to the synthesizing unit 4, so that the synthesizing unit 4 can perform the synthesizing operation appropriately.

Figure 2B:
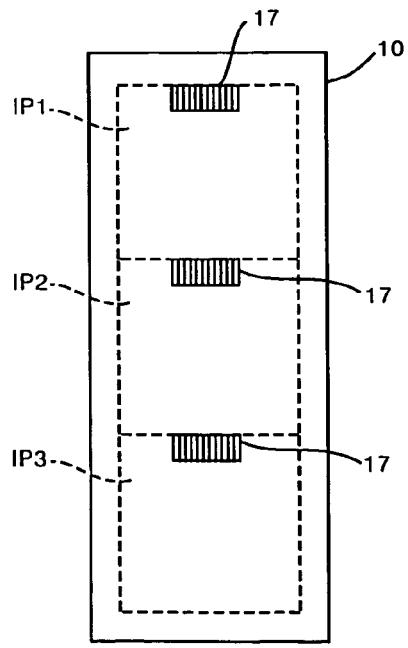
FIG. 2b is a diagram illustrating an example of arrangement of a plurality of stimulable phosphor sheets in the long cassette having bar code readout windows.

Further, although, in the first embodiment, the operations of reading the bar codes B are performed after the stimulable phosphor sheets IP1 to IP3 are transferred to the standard cassette 15, the long cassette 10 may have bar code readout windows 17 at the locations corresponding to the bar codes B attached to the stimulable phosphor sheets IP1 to IP3, as illustrated in FIG. 2*b*. When the long cassette 10 as illustrated in FIG. 2*b* is used, the bar codes B may be read before the object is radiographed.

Second Embodiment

Next, the second embodiment is explained below.

Figure 8:
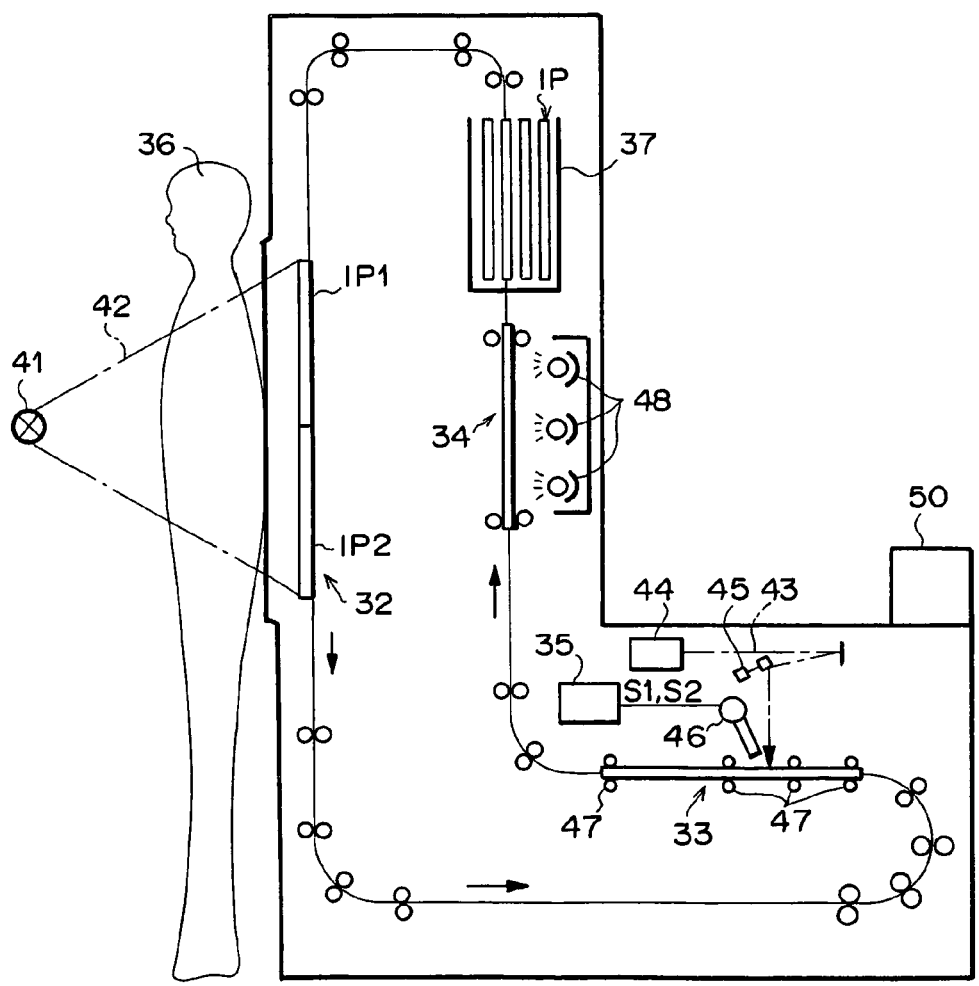
FIG. 8 is a diagram illustrating the construction of the radiographic image recording and reading apparatus in the second embodiment of the present invention.

FIG. 8 is a diagram illustrating a construction of a built-in radiographic image recording and reading apparatus containing the image synthesizing system as the second embodiment of the present invention. As illustrated in FIG. 8, this radiographic image recording and reading apparatus contains a circulating conveyor, an image recording portion 32, an image readout portion 33, an erasing portion 34, and an image processing portion 35. The circulating conveyor has a plurality of rollers for conveying stimulable phosphor sheets IP, and the image recording portion 32 is provided along the path of the circulating conveyor.

Two stimulable phosphor sheets IP1 and IP2 are conveyed from the sheet holding portion 37 to the image recording portion 32. In the image recording portion 32, the stimulable phosphor sheets IP1 and IP2 are held side by side in the vertical direction as illustrated in FIG. 8, where the two stimulable phosphor sheets may abut each other, or near-edge portions of the two stimulable phosphor sheets may overlap. Then, radiated rays 42 are emitted from the radiation source 41, and the stimulable phosphor sheets IP1 and IP2 are thus exposed to the radiated rays 42 emitted from the radiation source 41 and passed through an object 36, so that the two portions of the object 36 are separately recorded in the respective stimulable phosphor sheets IP1 and IP2 as two divisional images. Next, the stimulable phosphor sheets IP1 and IP2, in which the divisional images of the object 36 are recorded, are conveyed to the image readout portion 33 by the circulating conveyor in the order from the stimulable phosphor sheet IP1 to the stimulable phosphor sheet IP2. The construction for positioning the stimulable phosphor sheets IP1 and IP2 in the image recording portion 32 is described in detail in Japanese Unexamined Patent Publication No. 3(1991)-287248, which is incorporated into this specification by reference.

The image readout unit 33 contains a laser source 44, a main scanning unit 45, a feeding direction conveying unit, and a photoelectric readout unit 46. The laser source 44 emits laser light 43 as stimulating light. The main scanning unit 45 sweeps the laser light 43 in the main scanning direction on the stimulable phosphor sheets IP1 and IP2, and may be realized by a galvanometer mirror. The feeding direction conveying unit moves the stimulable phosphor sheets IP1 and IP2 in the feeding direction at a constant speed, and may be realized by rollers 47. The photoelectric readout unit 46 detects the accelerated phosphorescence light emitted from the stimulable phosphor sheets IP1 and IP2 corresponding to the laser light 43 scanning the stimulable phosphor sheets IP1 and IP2, and obtains image data representing divisional images recorded in the stimulable phosphor sheets IP1 and IP2. The photoelectric readout unit 46 may be a photomultiplier.

The image data read out by the photoelectric readout unit 46 are then supplied to the image processing unit 35, and image processing is performed on the image data to obtain divisional image data S1 and S2. Then, the image processing unit 35 synthesizes the divisional image data S1 and S2 based on additional information F to obtain synthesized image data G. When the readout operation is completed, the stimulable phosphor sheets IP1 and IP2 are transferred by the circulation conveyor unit to the erasing unit 34.

The erasing unit 34 contains a number of erasing radiation sources 48 such as fluorescent lamps. When the stimulable phosphor sheets IP1 and IP2 are exposed to visible light from the erasing radiation sources 48, the remaining radiation energy in the stimulable phosphor sheets IP1 and IP2 is discharged. The erased stimulable phosphor sheets IP1 and IP2 are transferred by the circulating conveyor unit to the sheet holding unit 37 to be held therein until they are transferred again to the image recording unit 36 for the next operation of recording and reading out radiographic images.

The radiographic image recording and reading apparatus as the second embodiment also contains an input unit 50 for inputting information. When taking a plurality of radiographs of an object as a plurality of divisional images, information indicating that a plurality of radiographs are taken as a plurality of divisional images of an object is input from the input unit 50, and the additional information F is generated in the radiographic image recording and reading apparatus based on the arrangement in the image recording unit 32 in response to the above information input from the input unit 50. Since the operations from the arrangement of the stimulable phosphor sheets through the readout of the recorded image are automatically performed in the radiographic image recording and reading apparatus, the only information that is required to be input is the above information indicating that radiographs of an object are taken as a plurality of divisional images. When the information indicating that radiographs are taken as a plurality of divisional images is input from the input unit 50, the additional information F indicating that the plurality of radiographs are related to each other is automatically generated in the radiographic image recording and reading apparatus. Therefore, it is not necessary for the operator to input the other information such as the information on the arrangement, order, and orientations of the divisional images, which are automatically generated in the radiographic image recording and reading apparatus.

The operations of the second embodiment are explained below.

First, two stimulable phosphor sheets IP1 and IP2 are transferred to the image recording unit 32, and are arranged so that the two stimulable phosphor sheets abut each other, or near-edge portions of the two stimulable phosphor sheets overlap. Then, the radiation source 41 is activated to record radiographic images of the object 36 in the stimulable phosphor sheets IP1 and IP2 as the divisional images. The stimulable phosphor sheets IP1 and IP2 in which the radiographic images are recorded are successively transferred to the image readout unit 33. In the image readout unit 33, the divisional images recorded in the stimulable phosphor sheets IP1 and IP2 are read out to obtain image data representing the divisional images in a similar manner to the first embodiment. The obtained image data is supplied to the image processing unit 35. In the image processing unit 35, predetermined image processing is performed on the supplied image data to obtain divisional image data S1 and S2. For the operations in the image readout unit 33 and the image processing unit 35, the reading conditions and the image processing conditions are set up to be identical in the two stimulable phosphor sheets IP1 and IP2. In the image processing unit 35, the divisional image data S1 and S2 are synthesized to obtain the synthesized image data G based on the additional information F input from the input unit 50 in the manner similar to the first embodiment. That is, the obtained synthesized image data G is output from the image readout unit 33, and stored in the database. The synthesized image data G is displayed on a monitor for confirmation of the synthesized image, can be reproduced by the reproduction unit, and may be measured using the measurement unit, in the manner described for the first embodiment. Thereafter, the stimulable phosphor sheets IP1 and IP2 are transferred to and held in the sheet holding unit 37 for the next recording and reading operations.

As described above, similar to the first embodiment, the synthesized image data G is obtained by synthesizing the divisional image data S1 and S2 based on the additional information F in the second embodiment. Therefore, it is no longer necessary for the operator to continuously monitor the stimulable phosphor sheets and the image data from the time the radiographs are taken until the image data are synthesized, and it is also not necessary for the operator to display the image data for confirming whether or not the image data are divisional image data. Thus, the load imposed on the operators can be reduced. In addition, since it is not necessary to radiograph the reference lattice pattern and the object at the same time, the synthesized image does not contain the interfering pattern.

Figure 9:
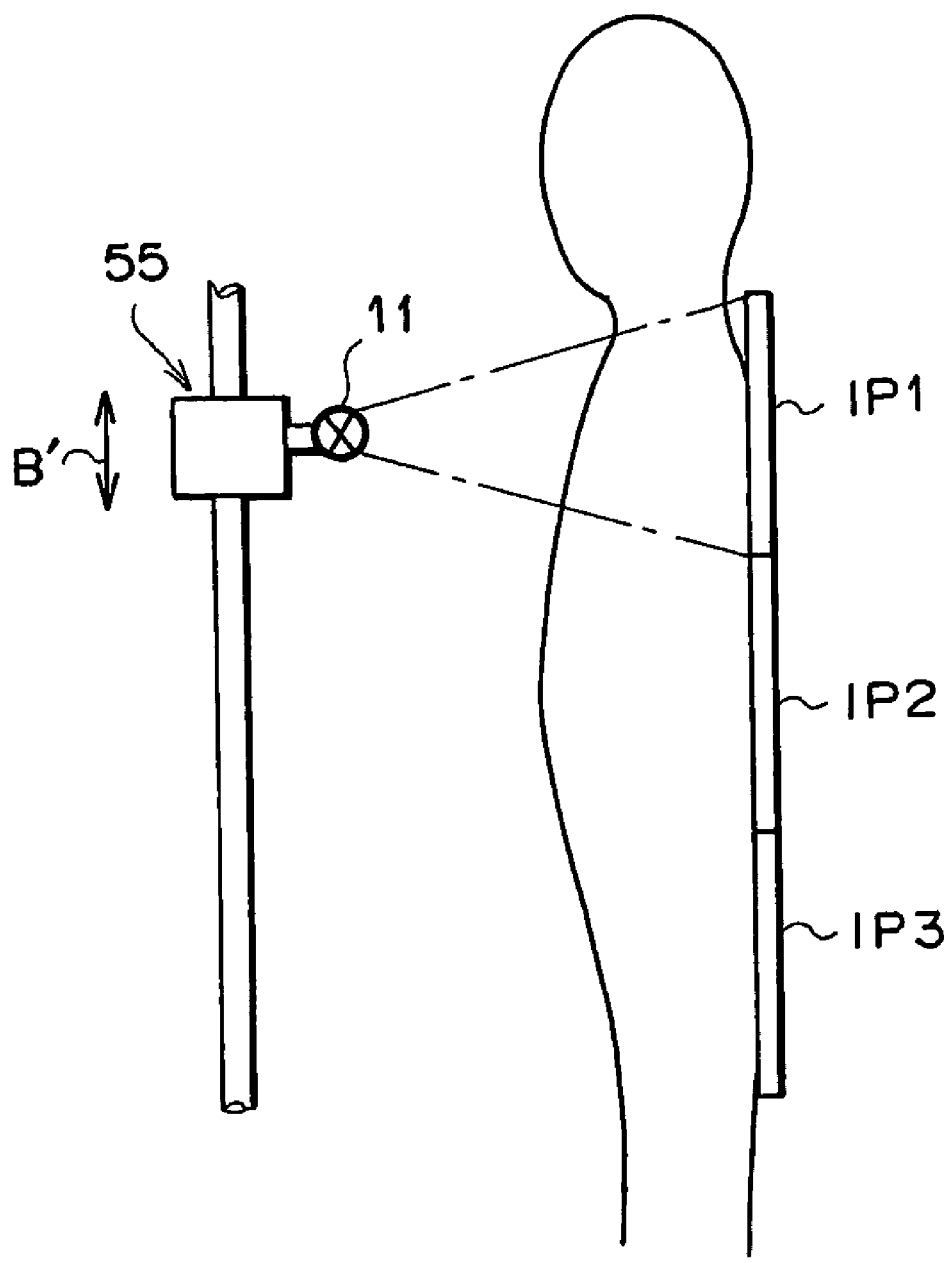
FIG. 9 is a diagram illustrating the construction of a variation of the present invention.

Although, in the first and second embodiments of the present invention, the radiographic images are recorded in a plurality of stimulable phosphor sheets at the same time, the radiographic images may be successively recorded in the plurality of stimulable phosphor sheets by using a mechanism 55 for moving the radiation source 11 in the directions of the arrows B', as illustrated in FIG. 9, where the long cassette 10 is not shown.

Figure 10:
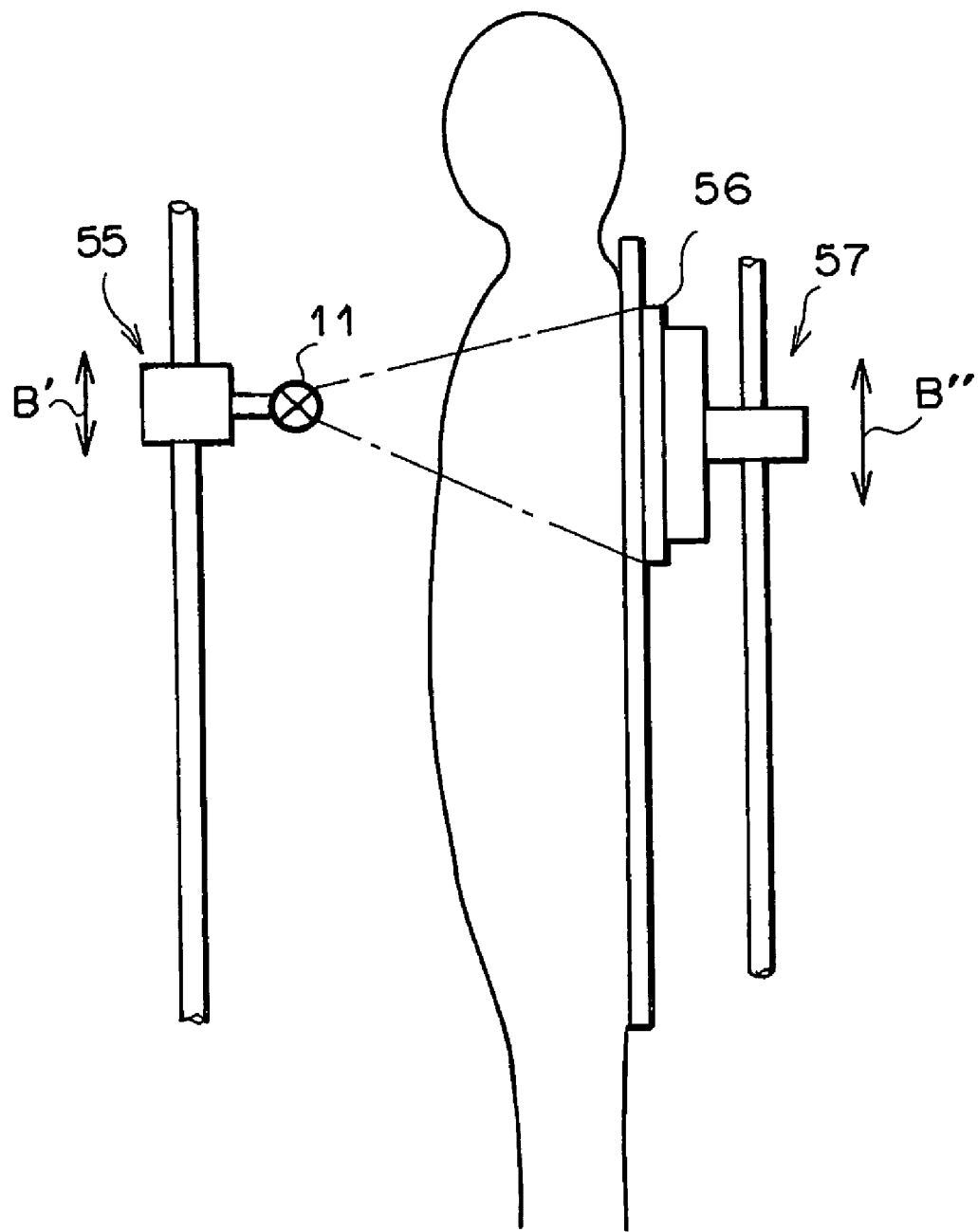
FIG. 10 is a diagram illustrating the construction of another variation of the present invention.

In addition to the above mechanism 55, a semiconductor sensor 56 and a mechanism 57 for moving the semiconductor sensor 56 in the directions of the arrows B" may be provided as illustrated in FIG. 10, and the radiation source 11 and the semiconductor sensor 56 may be moved together for recording a radiographic image. In this case, since image data representing a radiographic image are directly output from the semiconductor sensor 56, the readout unit for reading out the radiographic image from the stimulable phosphor sheet is unnecessary.

In the above embodiments, each pair of adjacent stimulable phosphor sheets may abut each other when taking a radiograph. However, it is preferable that near-edge portions of the adjacent stimulable phosphor sheets in each pair overlap when taking a radiograph.

Figure 11:
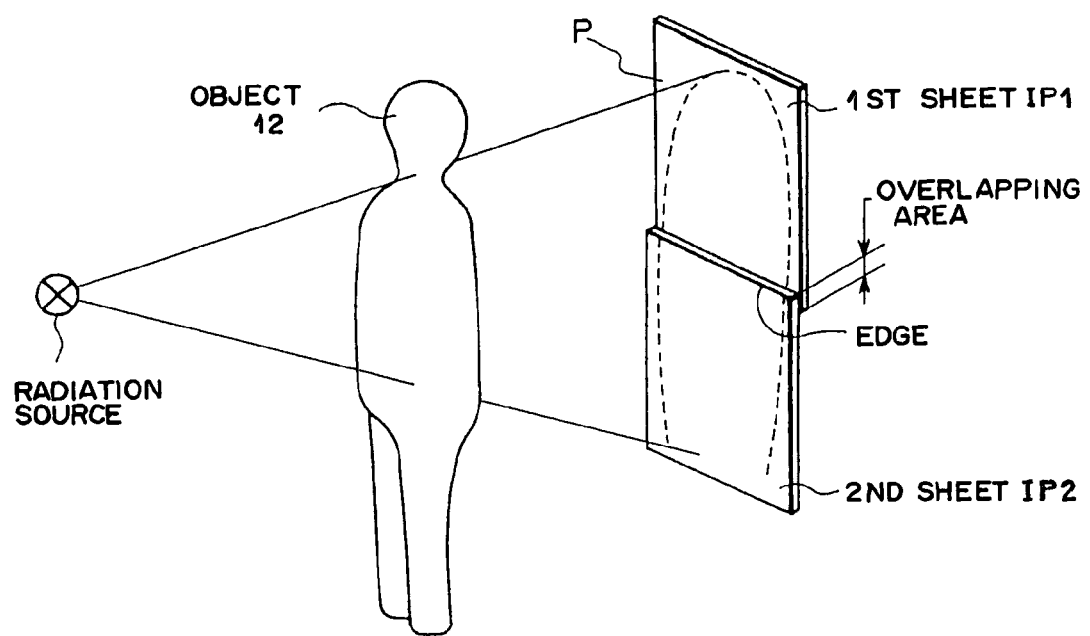
FIG. 11 is a diagram illustrating a radiography configuration wherein adjacent stimulable phosphor sheets partially overlap.
Figure 12A:
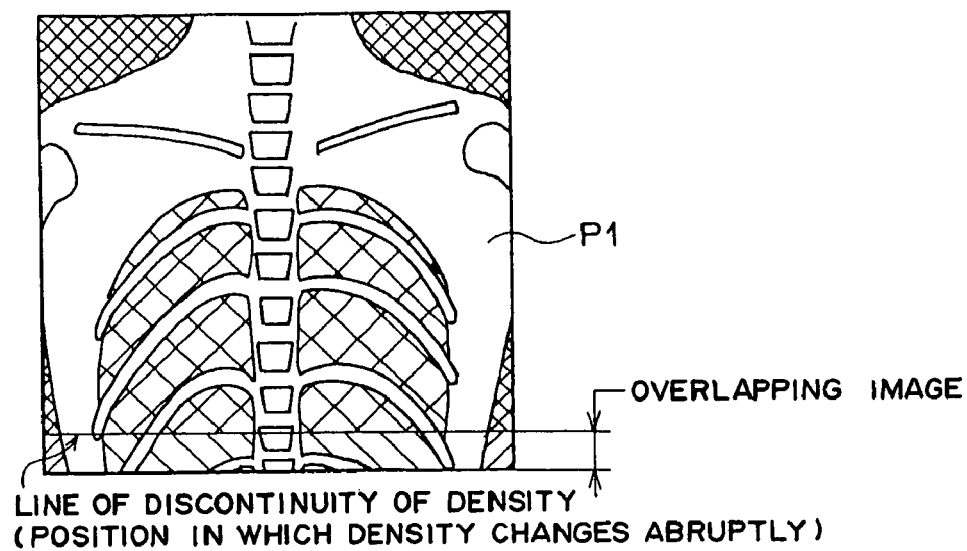
FIGS. 12a and 12b are diagrams illustrating examples of divisional images recorded in the stimulable phosphor sheets in the configuration of FIG. 11.
Figure 12B:
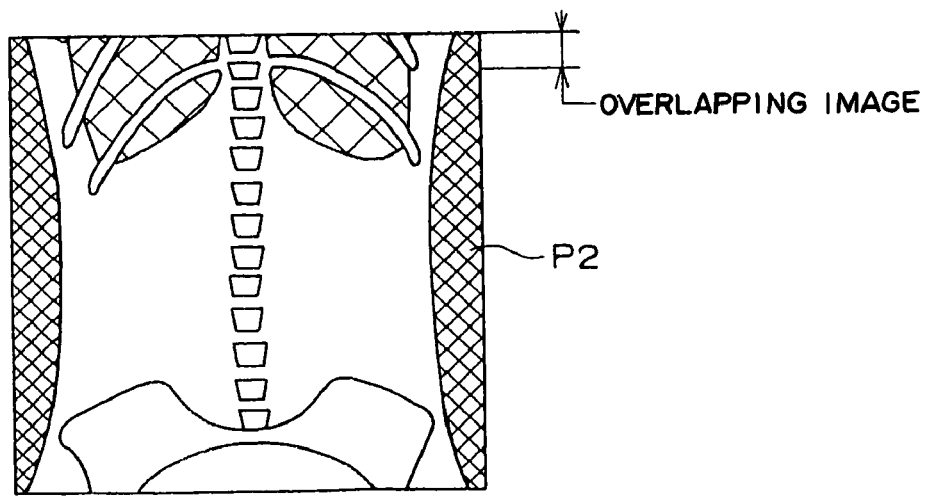

For example, as illustrated in FIG. 11, two stimulable phosphor sheets IP1 and IP2 are arranged in the vertical direction so that a portion near the lower edge of the first stimulable phosphor sheet IP1 and a portion near the upper edge of the second stimulable phosphor sheet IP2 overlap, and then a radiographic image of an object 12 is recorded in the two stimulable phosphor sheets IP1 and IP2. That is, first and second divisional images of the object 12 are recorded in the two stimulable phosphor sheets IP1 and IP2, respectively. Due to the above overlapping arrangement of the stimulable phosphor sheets, the first and second divisional images include identical (overlapping) images which correspond to an identical portion of the object 12 and are recorded in the overlapping portions of the first and second stimulable phosphor sheets IP1 and IP2, as illustrated in FIGS. 12a and 12b. The two adjacent divisional images can be aligned with each other more easily in the case wherein the two adjacent divisional images to be synthesized include overlapping images corresponding to an identical portion of an object 12, than in the case wherein the two adjacent divisional images are recorded in the two adjacent stimulable phosphor sheets which abut each other. This is because, in the former case, the two adjacent divisional images can be aligned with each other so that the overlapping images in the two adjacent divisional images coincide. For example, in order to align the two adjacent divisional images with each other, it is possible to perform pattern matching between the overlapping images in the two adjacent divisional images.

In the case where the two adjacent divisional images P1 and P2 are recorded in the two stimulable phosphor sheets IP1 and IP2 which overlap partially, as illustrated in FIG. 11, the synthesizing unit according to the present invention adopts only one of the overlapping images in the two adjacent divisional images into the synthesized image. In this case, it is preferable to adopt into the synthesized image the overlapping image recorded in one of the stimulable phosphor sheets IP1 and IP2 which is located nearer to the object 12 than the other. In the example of FIG. 11, it is preferable to adopt into the synthesized image the overlapping image recorded in the stimulable phosphor sheet IP2. This is because, in the overlapping portion of the stimulable phosphor sheet IP1 which is located further from the object 12 than the other stimulable phosphor sheet IP2, the image is formed by radiation which has passed through the overlapping portion of the stimulable phosphor sheet IP2 which is located nearer to the object 12. That is, a radiological dosage to the overlapping portion of the stimulable phosphor sheet IP1 is smaller than a radiological dosage to nonoverlapping portions of the stimulable phosphor sheets, due to attenuation of the radiation due to passage through the overlapping portion of the stimulable phosphor sheet IP2. Consequently, the density of the overlapping image recorded in the overlapping portion of the stimulable phosphor sheet IP1 is smaller than the density of a portion of divisional image recorded in the nonoverlapping portion of the stimulable phosphor sheet IP1. Therefore, if the overlapping image recorded in the stimulable phosphor sheet IP1 which is located further from the object 12 is adopted into the synthesized image, discontinuity of density appears in the synthesized image at a position corresponding to the boundary between the overlapping portion and the nonoverlapping portion. Such discontinuity of density will affect diagnosis using the synthesized image.

On the other hand, radiation is applied on the overlapping portion of the stimulable phosphor sheet IP2 under the same condition as the nonoverlapping portion of the stimulable phosphor sheet IP2 since the overlapping portion of the stimulable phosphor sheet IP2 is located nearer to the object 12. Therefore, no discontinuity of density appears in the divisional image P2 recorded in the stimulable phosphor sheet IP2 at a position corresponding to the boundary between the overlapping portion and the nonoverlapping portion. Thus, when the overlapping image recorded in the stimulable phosphor sheet IP2, which is located nearer to the object 12 than the other stimulable phosphor sheet IP1, is adopted into the synthesized image, no discontinuity of density appears in the synthesized image at a position corresponding to the boundary between the overlapping portion and the nonoverlapping portion, and therefore diagnosis using the synthesized image is not affected by discontinuity of density.

The synthesizing unit may be supplied with information indicating which of two stimulable phosphor sheets is located nearer to the object than the other when the object is radiographed, where the information may be supplied as a portion of the additional information F which is input by an operator to the ID terminal (IDT) 3. Otherwise, in the case where there is a predetermined rule as to which of two stimulable phosphor sheets is located nearer to the object than the other, the synthesizing unit can adopt the overlapping image recorded in the stimulable phosphor sheet located nearer to the object than the other stimulable phosphor sheet, based on the predetermined rule without being supplied with the above information. The rule may be predetermined according to structure of the cassette. For example, in the configuration of FIG. 11, the rule may be that a stimulable phosphor sheet arranged on the lower side is located nearer to the object than the stimulable phosphor sheet arranged on the upper side.

Further, as mentioned before, there is discontinuity of density in the divisional image recorded in the stimulable phosphor sheet at a position corresponding to the boundary between the overlapping portion and the nonoverlapping portion. Therefore, the synthesizing unit may be constructed so as to search for the discontinuity of density in both divisional images recorded in each pair of adjacent stimulable phosphor sheets, and determine that one of the pair of adjacent stimulable phosphor sheets in which the above discontinuity of density is not recorded is the stimulable phosphor sheet located nearer to the object than the other.

All of the contents of the Japanese Patent Application Nos. 10(1998)-355789 and 11(1999)-305610 are incorporated into this specification by reference.

What is claimed is:

1. An image synthesizing system for synthesizing more than one item of divisional image data respectively representing more than one image of more than one portion of an object, said system comprising:
    an input unit for inputting said more than one item of divisional image data, and for each of said more than one item of divisional image data, further inputting additional information including information indicating that said more than one item of divisional image data represents a series of images related to each other, and indicating a proper sequential order of the more than on item of divisional image data, which are to be synthesized, wherein said proper sequential order indicates relative positions of the more than one item of divisional image data at a time when photographs of the more than one item of divisional image data are taken;
    a synthesizing unit for synthesizing said more than one item of divisional image data in the proper sequential order automatically, based on said additional information to obtain an item of synthesized image data representing a synthesized image even when an order of the input of the more than one item of divisional image data becomes out of the proper sequential order for the series of images related to each other; and
    an output unit for outputting said item of synthesized image data;
    wherein the additional information and the more than one item of divisional image data are input independently.

2. An image synthesizing system according to claim 1, wherein said synthesizing unit comprises,
    a determination unit for determining geometrical mismatch correction information for use in correcting a geometrical mismatch between said more than one item of divisional image data, and a geometrical mismatch correction unit for correcting said geometrical mismatch between said more than one item of divisional image data based on said geometrical mismatch correction information.

3. An image synthesizing system according to claim 1, further comprising a divisional image storing unit for storing said more than one item of divisional image data and said additional information associated with said more than one item of divisional image data.

4. An image synthesizing system according to claim 2, further comprising a divisional image storing unit for storing said more than one item of divisional image data and at least one of said additional information and said geometrical mismatch correction information associated with said more than one item of divisional image data.

5. An image synthesizing system according to claim 1, wherein said synthesizing unit comprises a unit for matching conditions in said more than one item of divisional image data for the operation of the synthesizing unit.

6. An image synthesizing system according to claim 1, further comprising a data obtaining unit for obtaining said more than one item of divisional image data and said additional information.

7. An image synthesizing system according to claim 6, wherein said data obtaining unit comprises a unit for matching conditions in said more than one item of divisional image data for the operation of the data obtaining unit.

8. An image synthesizing system according to claim 1, wherein said additional information contains orientation information indicating orientations of said more than one item of divisional image.

9. An image synthesizing system according to claim 1, further comprising a synthesized image storing unit for storing said item of synthesized image data.

10. An image synthesizing system according to claim 1, further comprising a display unit for displaying said synthesized image.

11. An image synthesizing system according to claim 10, further comprising a correction unit for use in correcting said synthesized image displayed by said display unit.

12. An image synthesizing system according to claim 1, wherein each pair of adjacent ones of said more than one item of divisional image data include overlapping portions.

13. An image synthesizing system according to claim 1, wherein said more than one item of divisional image data is obtained by taking a radiograph of said object in a plurality of recording sheets, where each pair of adjacent ones of the plurality of recording sheets partially overlap.

14. An image synthesizing system according to claim 13, wherein said plurality of recording sheets are a plurality of stimulable phosphor sheets which emit, upon exposure to stimulating light, accelerated phosphorescence light having an amount corresponding to the energy of radiation to which the plurality of stimulable phosphor sheets were exposed.

15. An image synthesizing system according to claim 13, wherein the synthesizing unit adopts into said synthesized image one of overlapping images in each pair of adjacent divisional images obtained from each pair of adjacent ones of the plurality of recording sheets, where said one of the overlapping images is recorded in that one of said each pair of adjacent ones of the plurality of recording sheets which is located nearer to said object than another of said each pair of adjacent ones of the plurality of recording sheets when said radiograph is taken.

16. An image synthesizing system according to claim 1, wherein the additional information comprises a discrete signal.

17. An image synthesizing system according to claim 16, wherein the discrete signal is formed independently of the divisional image data.

18. An image synthesizing system according to claim 1, wherein the synthesized image is based on an affine transform.

19. An image synthesizing system according to claim 1, wherein the synthesized image is based on a bar code associated with each of the more than one item of divisional image data.

20. An image synthesizing system according to claim 1, wherein the additional information indicates which items of divisional image data are to be synthesized.

21. An image synthesizing system for synthesizing more than one item of divisional image data respectively representing more than one image of more than one portion of an object said system comprising:
    an input unit for inputting said more than one item of divisional image data and additional information including information indicating that said more than one item of divisional image data represents a series of images related to each other in a predetermined order, which are to be synthesized, and position information which indicates relative positions of the more than one item of divisional image data at a time when photographs of the more than one item of divisional image data are taken;
    a synthesizing unit for synthesizing said more than one item of divisional image data based on said additional information to obtain an item of synthesized image data representing a synthesized image; and
    an output unit for outputting said item of synthesized image data;
    wherein the additional information is independent of content of each of the more than one item of divisional image data are input independently;
    wherein the additional information includes at least one of a density and a contrast of the more than one item of divisional image data.

22. An image synthesizing system according to claim 21, wherein the additional information includes a discontinuity condition on the at least one of the density and the contrast at a boundary of the more than one item of divisional image data.

23. An image synthesizing system according to claim 1, wherein neither the divisional image data nor the additional information includes a reference lattice pattern.

24. An image synthesizing system for synthesizing more than one item of divisional image data respectively representing more than one image of more than one portion of an object, said system comprising:
    an input unit for inputting said more than one item of divisional image data, and for each of said more than one item of divisional image data, inputting additional information including information indicating that said more than one item of divisional image data represents a series of images related to each other, and indicating a proper sequential order for divisional images of the series of images, which are to be synthesized;
    a synthesizing unit for synthesizing said more than one item of divisional image data in said proper sequential order automatically, based on said additional information to obtain an item of synthesized image data representing a synthesized image, even when an input order of the more than one item of divisional image data occurs out of the proper sequential order for the divisional images of the series of images; and an output unit for outputting said item of synthesized image data;

wherein the additional information comprises a discrete signal; and wherein the discrete signal is formed independently of the divisional image data.

25. An image synthesizing system according to claim 1, wherein the additional information is a single discrete signal indicating a sequential order of the more than one item of divisional image data.

* * * * *